US006440192B2

(12) United States Patent
Guerin et al.

(10) Patent No.: US 6,440,192 B2
(45) Date of Patent: *Aug. 27, 2002

(54) FILTRATION DEVICE AND PROCESS FOR ITS MANUFACTURE

(75) Inventors: Richard Guerin, Ronfeugerai; Claude Legrand, Conde sur Noireau, both of (FR)

(73) Assignee: Valeo, Paris Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,147

(22) PCT Filed: Mar. 27, 1998

(86) PCT No.: PCT/FR98/00633

§ 371 (c)(1),
(2), (4) Date: Dec. 9, 1998

(87) PCT Pub. No.: WO98/45023

PCT Pub. Date: Oct. 15, 1998

(30) Foreign Application Priority Data

Apr. 10, 1997 (FR) .............................................. 97 04524

(51) Int. Cl.⁷ .......................... B01D 39/16; B01D 39/20
(52) U.S. Cl. ....................... 55/527; 55/528; 55/DIG. 5; 19/98; 19/296; 19/304; 28/104
(58) Field of Search .................... 55/527, 528, DIG. 5, 55/DIG. 39; 264/88, 168, 518, 546, 119, DIG. 48; 19/106 R, 296, 308, 307, 304, 99, 98; 156/181, 183; 28/104

(56) References Cited

U.S. PATENT DOCUMENTS

| 2,862,251 | A | * | 12/1958 | Kalwaites | 264/119 |
| 3,512,230 | A | * | 5/1970 | Luzzato | 264/168 |
| 3,563,241 | A | * | 2/1971 | Evans et al. | 264/518 |
| RE28,680 | E | * | 1/1976 | Harmon | 264/168 |
| 4,361,619 | A | * | 11/1982 | Forsten et al. | 55/DIG. 5 |
| 4,375,718 | A | * | 3/1983 | Wadsworth et al. | 55/DIG. 5 |
| 4,548,628 | A | * | 10/1985 | Miyake et al. | 55/487 |
| 4,599,766 | A | * | 7/1986 | Wirth | 19/106 R |
| 4,612,237 | A | * | 9/1986 | Frankenburg | 55/DIG. 5 |
| 4,615,080 | A | * | 10/1986 | Wirth | 19/106 R |
| 4,874,399 | A | * | 10/1989 | Reed et al. | 55/527 |
| 5,198,294 | A | * | 3/1993 | Masuda et al. | 28/104 |
| 5,368,734 | A | | 11/1994 | Wnenchak | |
| 5,375,306 | A | * | 12/1994 | Rousssin-Moynier | 28/104 |
| 5,380,580 | A | * | 1/1995 | Rogers et al. | 28/104 |
| 5,422,159 | A | * | 6/1995 | Fagan | 28/104 |
| 5,770,532 | A | * | 6/1998 | Fleissner | 28/104 |
| 5,970,583 | A | * | 10/1999 | Groten et al. | 19/296 |

FOREIGN PATENT DOCUMENTS

| EP | 0 066 414 | 12/1982 |
| FR | 2 698 285 | 5/1994 |
| FR | 2 717 802 | 9/1995 |

* cited by examiner

Primary Examiner—Duane S. Smith
(74) Attorney, Agent, or Firm—Morgan & Finnegan, LLP

(57) ABSTRACT

Disclosed is a process for manufacturing a filtration device. The process includes a fibre carding procedure which forms a web. The filtration device in accordance with the invention takes the form of a web having a single layer lap.

20 Claims, No Drawings

FILTRATION DEVICE AND PROCESS FOR ITS MANUFACTURE

BACKGROUND OF THE INVENTION

The present invention concerns a process for manufacturing a filtration device more particularly intended for filtering gases such as air for ventilating and/or heating and/or air conditioning rooms or motor vehicles.

The invention also concerns a filtration device manufactured by the above process.

Prior art filtration devices are made by spinning a thermoplastics polymer through nozzles to produce an intermingling of the filaments issuing from the nozzles forming, after cooling, a lap that can constitute a particle filter.

The prior art processes have the drawback of necessitating the superposition and binding together of a plurality of layers in order to obtain filters that are sufficiently efficient.

The filters obtained in this way have a high specific gravity and a high unit cost.

BRIEF SUMMARY OF THE INVENTION

An aim of the invention is to manufacture a filtration device that is efficient and less dense and more economic than the prior art devices.

DETAILED DESCRIPTION OF THE INVENTION

The process for manufacturing a filtration device of the aforementioned type in accordance with the invention is characterised in that it comprises an operation of carding fibers having a length in the range 38 mm to 120 mm and a diameter greater than 10 µm to form an isotropic web and in that said web is subjected to a mechanical consolidation operation by means of hydraulic binding consisting in passing very fine water jets at a high pressure through the web disposed on a rotating drum followed by a drying operation.

In accordance with other features of the process in accordance with the invention, separately or in all technically possible combinations:
  the carding operation is carried out using a wool type card;
  said card incorporates DISPELMEL type randomizing units;
  the pressure of the water jets used for the hydraulic binding is in the range 40 bars to 200 bars;
  the parameters of the card are chosen to obtain a web having a mass per unit surface area in the range approximately 20 g/m² to approximately 150 g/m².

In accordance with the invention the filtration device of the above type is characterised in that it comprises an isotropic web.

In accordance with other features of the filtration device in accordance with the invention, separately or in all technically possible combinations:
  said web is in a single layer;
  the length of said fibers is at least equal to 38 mm;
  the length of said fibers is at most equal to 120 mm;
  the average diameter of said fibers is at least equal to 10 µm;
  said fibers are fibers of the same kind or a mixture of different fibers.
  said fibers are selected from the group of thermoplastics fibers such as fibers of polypropylene, polyethylene, polyester, polycarbonate, polyamide, the group of acrylic fibers, pre-oxidized acrylic fibers, the group of aramide fibers, the group of phenolic fibers, the group of fluorocarbon fibers, the group of mineral fibers such as glass fibers and the group of metal fibers.

It has been found that the invention provides a filtration device that is efficient and of lower unit cost and of lower specific gravity than the prior art filtration devices.

Another important advantage compared to the prior art is that the head loss when a gas passes through the filtration device is much lower.

Other aspects and advantages of the invention will become apparent in the following description of one embodiment of a filtration device designed to be installed in equipment for heating/air conditioning a motor vehicle.

1.7 Tex (14 µm diameter) polypropylene fibers are cut to a length of 40 mm and then introduced into a mixer.

The fiber mixture obtained is then carded by means of a two-doffer wool type card equipped with a "DISPELMEL" type randomising unit to obtain an isotropic web.

In one variant of the process the web leaving the card introduced into a condenser to form a single-layer lap.

The parameters of the card and/or of the condenser are selected to produce a web or a lap having a mass per unit surface area in the range approximately 20 g/m² to approximately 150 g/m².

The web or lap is deposited onto a belt and then consolidated by a hydraulic binding operation.

The hydraulic binding operation consists in passing very fine water jets at a high pressure (in the range 40 bars to 200 bars) through the web or lap disposed on a rotating drum.

When they bounce off the drum the water jets cause knotting of the fibers imparting a high mechanical strength to the web or lap without significantly increasing its specific gravity.

After drying, the web or lap is mounted on a support to form the filtration device.

Using a 0.84 mm thick web or lap the process has produced a filter having a mass per unit surface area of 66 g/m² and a specific gravity of 0.07.

To test the efficiency of a filter obtained in the above manner, it was disposed across an area of 100 cm² and subjected to a flow of air laden with particles at flow rate of 20 cm/s.

The particles corresponded to a "fine SAE powder" defined in US Standard SAE J 726/ISO 5011.

The particle concentration was 100 mg/m³.

The head loss across the filter under the above conditions was only 14 Pa and the efficiency was 80%.

Compared to filtration devices currently on the market, an efficiency comparable to the best of them was obtained with a product having a much lower specific gravity (0.07 compared to 0.12 to 0.30) generating a much lower head loss.

Endurance tests have shown that the efficiency of the filtration device in accordance with the invention is more stable with time.

What is more, the process described hereinabove is carried out continuously and produces the filtration device in a single operation.

What is claimed is:

1. A process for manufacturing a gas filter comprising:
  carding fibers having a length in the range 38 mm to 120 mm and a diameter greater than about 10 µm to form an isotropic web;
  binding the web by passing very fine water jets at a high pressure through the web disposed on a rotating drum followed by a drying operation; and forming a filter from the web having a specific gravity lower than 0.12.

2. A process according to claim 1 wherein the carding is carried out using a wool card.

3. A process according to claim 2 wherein said card incorporates randomizing units.

4. A process according to claim 1 wherein the pressure of the water jets is in the range 40 bars to 200 bars.

5. A process according to claim 1 wherein the card produces a web having a mass per unit surface area in the range approximately 20 g/m² to approximately 150 g/m².

6. A process according to claim 1 wherein said fibers comprises a plurality of fibers formed of the same material.

7. A process according to claim 1 wherein said fibers are selected from the group consisting of thermoplastics fibers, polypropylene fibers, polyethylene fibers, polyester fibers, polycarbonate fibers, polyamide fibers, acrylic fibers, pre-oxidized acrylic fibers, aramide fibers, phenolic fibers, fluorocarbon fibers, mineral fibers, glass fibers, and metal fibers.

8. A filtration device for filtering gases such as air for ventilating, heating or air conditioning rooms or motor vehicles manufactured by the process comprising:
    carding fibers having a length in the range 38 mm to 120 mm and a diameter greater than about 10 µm to form an isotropic web;
    binding the web by passing very fine water jets at a high pressure through the web disposed on a rotating drum followed by a drying operation; and
    forming a filter from the web having specific gravity lower than 0.12.

9. A filtration device according to claim 8 wherein the isotropic web is made up of fibers having a length in the range 38 mm to 120 mm and an average diameter at least equal to 10 µm.

10. A filtration device according to claim 8 wherein the isotropic web is made up of polypropylene fibers having a length in the range 38 mm to 120 mm and an average diameter at least equal to 10 µm.

11. A process according to claim 1 wherein said fibers included a plurality of fibers formed of different materials.

12. A filtration device according to claim 8 wherein said fibers are selected from a group consisting of thermoplastic fibers, polypropylene fibers, polyester fibers, polycarbonite fibers, polyamide fibers, acrylic fibers, pre-oxidized acrylic fibers, aramide fibers, phenolic fibers, fluorocarbon fibers, glass fibers, and metal fibers.

13. A filtration device according to claim 8 which has a mass per unit surface area of about 20 g/m² to about 150 g/m².

14. A process according to claim 1 wherein the gas filter has a specific gravity lower than approximately 0.07.

15. A filtration device according to claim 8, wherein the filtration device has a specific gravity of about 0.07.

16. A process according to claim 1, further comprising the step of:
    introducing the web into a condenser to form a single-layer lap after the carding step.

17. A process for manufacturing a gas filter according to claim 16, wherein said condenser is selected to produce a web having a mass per unit surface area in the range of about 20 g/m² to about 150 g/m².

18. A filtration device for filtering gases such as air for ventilating, heating or air conditioning rooms or motor vehicles manufactured by the process according to claim 8, further comprising the step of:
    introducing the web into a condenser to form a single-layer lap after the carding step.

19. A process for manufacturing a gas filter comprising:
    carding fibers to form an isotropic web; and
    binding the web by passing very fine water jets at a high pressure through the web disposed on a rotating drum followed by a drying operation; and
    forming a filter from the web having a specific gravity lower than 0.12.

20. A filtration device for filtering gases such as air for ventilating, heating or air conditioning rooms or motor vehicles manufactured by the process comprising:
    carding fibers to form an isotropic web; and
    binding the web by passing very fine water jets at a high pressure through the web disposed on a rotating drum followed by a drying operation; and forming a filter from the web having a specific gravity lower than 0.12.

* * * * *